US009658397B1

(12) United States Patent
Achkir (10) Patent No.: US 9,658,397 B1
(45) Date of Patent: May 23, 2017

(54) EMBEDDED UNIVERSAL WAVEGUIDE OPTICAL SPLITTERS/COUPLERS

(71) Applicant: Cisco Technology, Inc., San Jose, CA (US)

(72) Inventor: D. Brice Achkir, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/080,872

(22) Filed: Mar. 25, 2016

(51) Int. Cl.
*G02B 6/26* (2006.01)
*G02B 6/125* (2006.01)
*G02B 6/132* (2006.01)
*G02B 6/28* (2006.01)
*G02B 6/12* (2006.01)

(52) U.S. Cl.
CPC ............ *G02B 6/125* (2013.01); *G02B 6/132* (2013.01); *G02B 6/2804* (2013.01); *G02B 6/2817* (2013.01); *G02B 2006/1215* (2013.01); *G02B 2006/12104* (2013.01)

(58) Field of Classification Search
None
See application file for complete search history.

(56) References Cited

U.S. PATENT DOCUMENTS

| 4,346,961 | A | * | 8/1982 | Porter | G02B 6/2817 359/900 |
| 5,283,844 | A | * | 2/1994 | Rice | G02B 6/125 385/16 |
| 5,369,719 | A | * | 11/1994 | Mishima | G02B 6/2817 359/333 |
| 5,710,854 | A | * | 1/1998 | Myers | G02B 6/1221 385/129 |
| 2005/0213872 | A1 | * | 9/2005 | Iwamori | G02B 6/12002 385/14 |
| 2006/0023991 | A1 | * | 2/2006 | Okubora | G02B 6/1221 385/14 |
| 2006/0275004 | A1 | * | 12/2006 | Fujii | G02B 6/2817 385/129 |

(Continued)

FOREIGN PATENT DOCUMENTS

GB 2201806 A * 7/1988
JP 55-142311 A * 11/1980

OTHER PUBLICATIONS

Jenkins, et al., "Hollow Waveguide Optical PCB Technology for Micro-Optical Sensors", 6th ESA Round Table on Micro & Nano Technologies for Space Applications, Oct. 11, 2007, 22 pages, QinetiQ Ltd.

(Continued)

*Primary Examiner* — Mike Stahl
(74) *Attorney, Agent, or Firm* — Parker Ibrahim & Berg LLC; James M. Behmke; Stephen D. LeBarron (57) ABSTRACT

In one embodiment, an optical splitter/coupler may be created by i) providing an optical waveguide having a first waveguide channel core, ii) forming an angular trench at an end of the first waveguide channel core, the angular trench establishing first and second facets within the first waveguide channel core, and iii) mirroring the first and second facets, wherein the mirrored first and second facets are configured to provide optical reflection into and/or from respective second and third waveguide channel cores located at correspondingly opposing sides of the first waveguide channel core.

20 Claims, 11 Drawing Sheets

(56) References Cited

U.S. PATENT DOCUMENTS

2009/0244716 A1* 10/2009 Mathai ................ G02B 27/143
                                              359/636
2011/0206320 A1*  8/2011 Kuo ..................... G02B 6/2817
                                              385/32

OTHER PUBLICATIONS

Libsch, Frank, "Optical PCB Overview", IBM Research, Nov. 16, 2011, 34 pages, IBM Corporation.
One Silicon Chip Photonics, http://onesiliconchipphotonics.com/technology, 1 page, printed Mar. 7, 2016, World Wide Web.
Siminovitch, Michael J., "Centralized Lighting Systems for Office Interiors", Journal of the Russian Illuminating Engineering Society, Report No. LBL-37864, May 1, 1994, 6 pages.
Splitters / Couplers / PLC Splitters, http://www.fibertronics-store.com/Splitters-Couplers-PLC-Splitters_c834.htm, printed Mar. 7, 2016. 2 pages, Fibertronics, Inc., World Wide Web.

* cited by examiner

EMBEDDED UNIVERSAL WAVEGUIDE OPTICAL SPLITTERS/COUPLERS

TECHNICAL FIELD

The present disclosure relates generally to computing hardware, and, more particularly, to embedded universal waveguide optical splitters/couplers.

BACKGROUND

The trend toward integrating more photonics components into high speed systems is increasing at an unprecedented rate. The usage is not limited to high end systems; more and more demands for high speed links with low cost is needed the data center is a typical case. At the printed circuit board (PCB) level, there is a movement toward integrating waveguide technology to carry huge amounts of data at higher speeds, while attempting to solve signal integrity issues associated with copper and lowering the cost involved in compensation components, such as eye openers, re-timers, etc. At the chip level there are needs for integration TOSAs (transmitter optical sub-assemblies) and ROSAs (receiver optical sub-assemblies) at the packing level or within the dies themselves in the case of silicon photonics (e.g., optical field programmable gate arrays, or FPGAs).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an optical splitter/coupler may be created by i) providing an optical waveguide having a first waveguide channel core, ii) forming an angular trench at an end of the first waveguide channel core, the angular trench establishing first and second facets within the first waveguide channel core, and iii) mirroring the first and second facets, wherein the mirrored first and second facets are configured to provide optical reflection into and/or from respective second and third waveguide channel cores located at correspondingly opposing sides of the first waveguide channel core.

Description

As noted above, the trend toward integrating more photonics components into high speed systems is increasing at an unprecedented rate. To enable this integration, and particularly at a low cost, it would be beneficial to develop more components that can be integrated directly into PCBs and chip packaging. Waveguide technology offers a great opportunity, and although waveguides using polymers are already in use as channels integrated into a standard PCB, the techniques herein advance the integration. In particular, optical splitters and couplers are critical to enable monitoring, redundancy, combining, and protection for optical links. Whether for trunk-side applications or client-side applications, or inside a transceiver, and whether at the chip level or PCB or a system, these aforementioned components are critical.

Traditional components are unsuitable, as they are bulkier and difficult to deal with. For instance, most optical splitting is based on fiber optics, and can't be used when making chips or PCBs due to their size. Fiber optics are also unable to split signals at a is ratio other than 50/50 without extremely complex systems. Other techniques use mirrors placed in free-space (air, gas, vacuum, etc.), but the current mirrored systems are much larger than chip-level sizes (e.g., <20 microns), and losses are created in transitions. Mirrors are also generally unsuited for PCB use/design.

To enable enhanced integration of optical splitters and couplers for photonics chips and PCBs, the techniques herein introduce a small way to integrate these components. That is, the techniques herein create small footprint splitters and couplers using waveguide technology (polymer-based or glass-based) that can be embedded into a chip and its packaging, or into a PCB in inter-layers or on the surface. Specifically, according to one or more embodiments of the disclosure as described in detail below, an optical splitter/coupler may be created by i) providing an optical waveguide having a first waveguide channel core, ii) forming an angular trench at an end of the first waveguide channel core, the angular trench establishing first and second facets within the first waveguide channel core, and iii) mirroring the first and second facets, wherein the mirrored first and second facets are configured to provide optical reflection into and/or from respective second and third waveguide channel cores located at correspondingly opposing sides of the first waveguide channel core.

Operationally, to achieve an optical splitter or coupler, the techniques herein start with a fabrication of a waveguide. The process can be used for any type of waveguide, such as various materials to create a polymer waveguide (polymer core) or glass-type (glass core), as well as various shapes (cross-sectional shape) such as rectangles or squares (boxed waveguides), circles (cylindrical waveguides), etc. Note also that these waveguides can be single mode or multimode (step index or graded index) with any core size, including standard cores such as, for example, a single mode core sized to about 9 microns. For simplification, the description herein will focus on polymer waveguides, but it will be readily apparent to those skilled in the art that the same concepts may be applied to all of the suitable types of optical waveguides. Also, for further simplification to explain and understand the concept, a square shape will be shown in the accompanying figures.

Figure 1A:
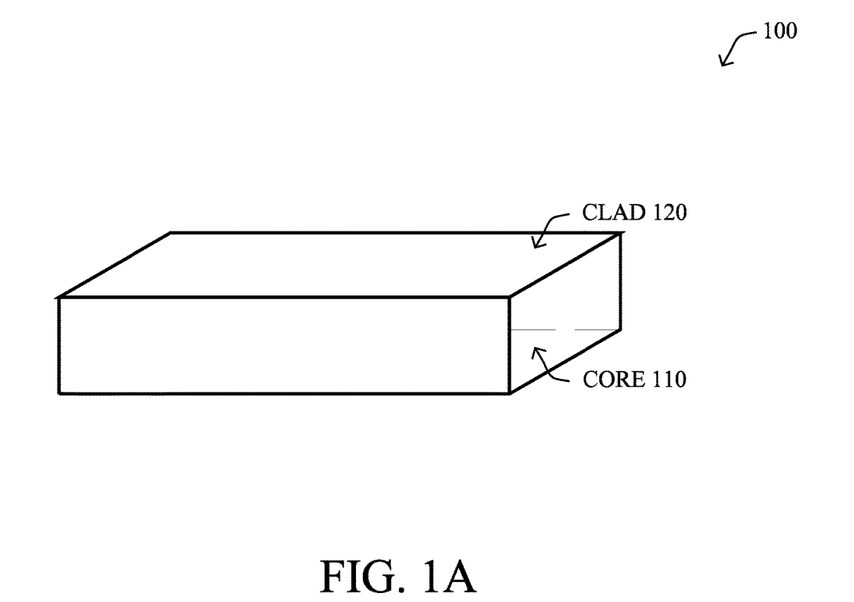
FIGS. 1A-1B illustrate an example optical waveguide.
Figure 1B:
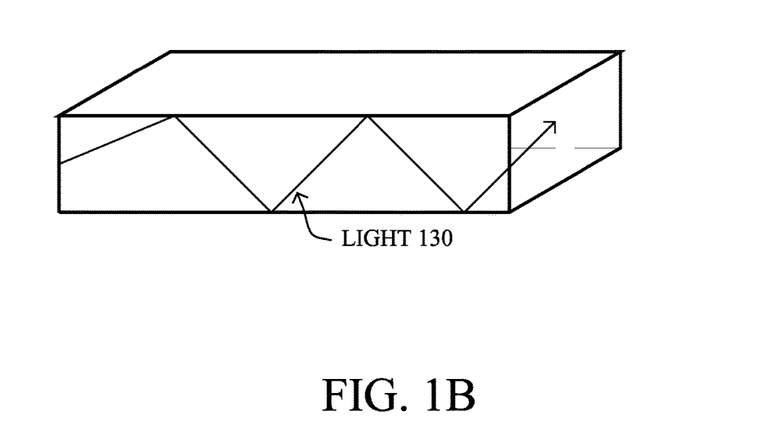

FIG. 1A, in particular, shows a squared optical waveguide 100 with a core 110 (a "waveguide channel core") and a clad 120, while FIG. 1B shows an optical signal 130 propagating through reflection between the core and the clad due to the differences between the refractive indexes.

Figure 2:
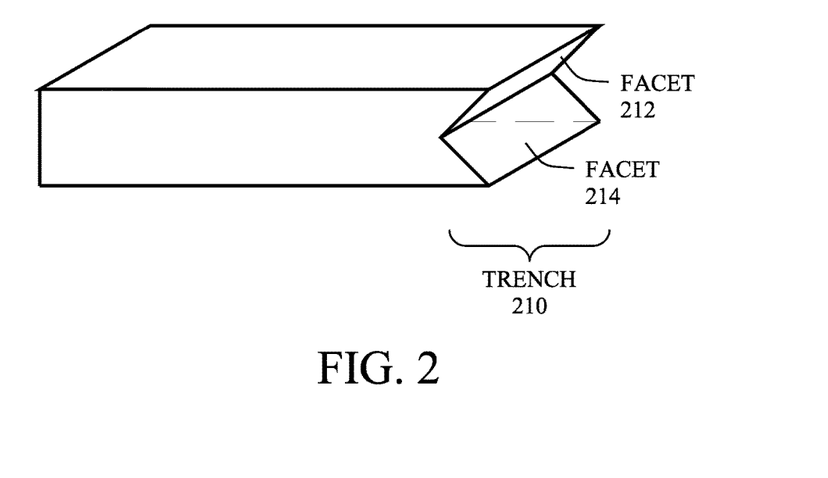
FIG. 2 illustrates an example faceted optical waveguide.

The techniques herein may thus be used convert this waveguide 100 into a small footprint splitter or coupler at an end of the core 110, e.g., a splitter that will split the light (Signal 130) by 50/50 (a 50:50 or 1:1 ratio) at the output. (Note that other ratios can be designed using a formula described below, but for simplicity, a 50/50 photonic splitter is used for illustration.) In particular, to achieve the desired splitter/couple, the techniques herein may start from the waveguide 100 displayed in FIG. 1A, and as shown in FIG. 2, an angular trench 210 is formed at the desired end of the waveguide channel core. For the example 50/50 splitter, a 45-degree angled trench is shown, where the two 45-degree structures or "facets" 212 and 214 obtained by formation (e.g., cutting) are identical. Note that although many techniques may be used to build a waveguide (e.g., wet, dry, embossing, or film based, etc.), the focus herein is not on the particular process to fabricate a waveguide. Accordingly, it is worth mentioning that forming/creating a trench 210 herein for the splitter/coupler can be realized with any of the fabrication techniques (e.g., forming the waveguide with the trench, removing the trench material from a formed waveguide core, etc.).

Figure 3:
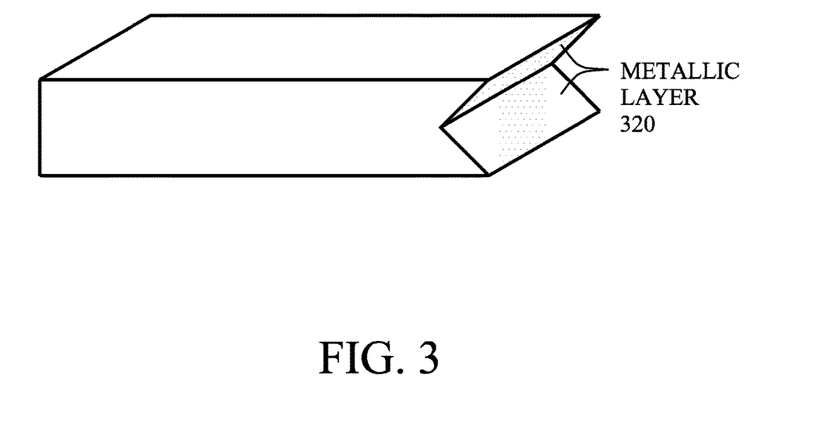
FIG. 3 illustrates an example of mirroring facets.
Figure 4A:
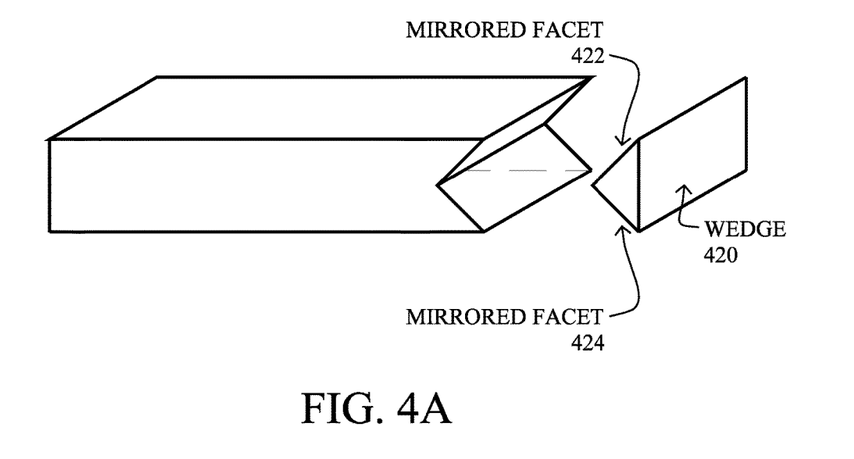
FIGS. 4A-4B illustrate another example of mirroring facets.
Figure 4B:
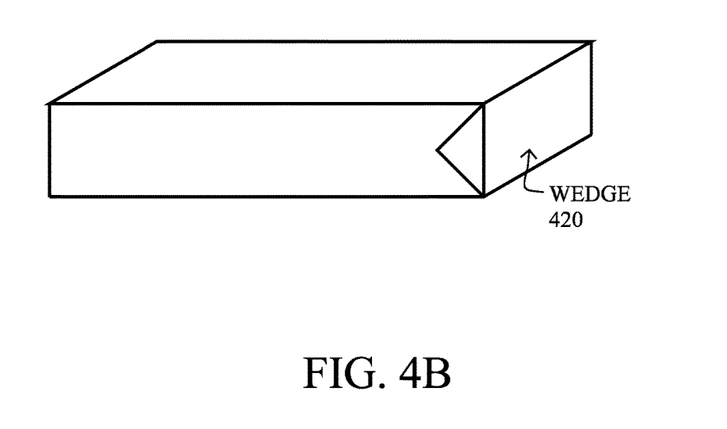

According to one or more embodiments herein, the next step in realizing a splitter/coupler is to establish a mirror-like finish on the facets 212 and 214 (i.e., "mirrored facets"). The mirroring of the facets may be achieved in a number of different manners. As a first example, as shown in FIG. 3, one method to mirror the facets is to deposit a thin metallic layer 320 on the facets, such as silver, gold, etc., on both of the facets 212/214 at the exposed end of the waveguide core. The deposition can be achieved using different techniques such as atomic deposition (e.g., with laser excimer) or deposition of a prefabricated thin metallic film. As shown in FIGS. 4A-4B, a second example technique is to prefabricate an angular mirrored wedge 420 (FIG. 4A) with first and second complimentary mirrored facets 422 and 424 that fit against the first and is second facets 212 and 214 of the angular trench 210, respectively (e.g., a wedge with 45-degree mirrors). This wedge 420 may then be combined with the formed/cut facets (e.g., 45-degree facets) of the waveguide core as shown in FIG. 4B.

Figure 5:
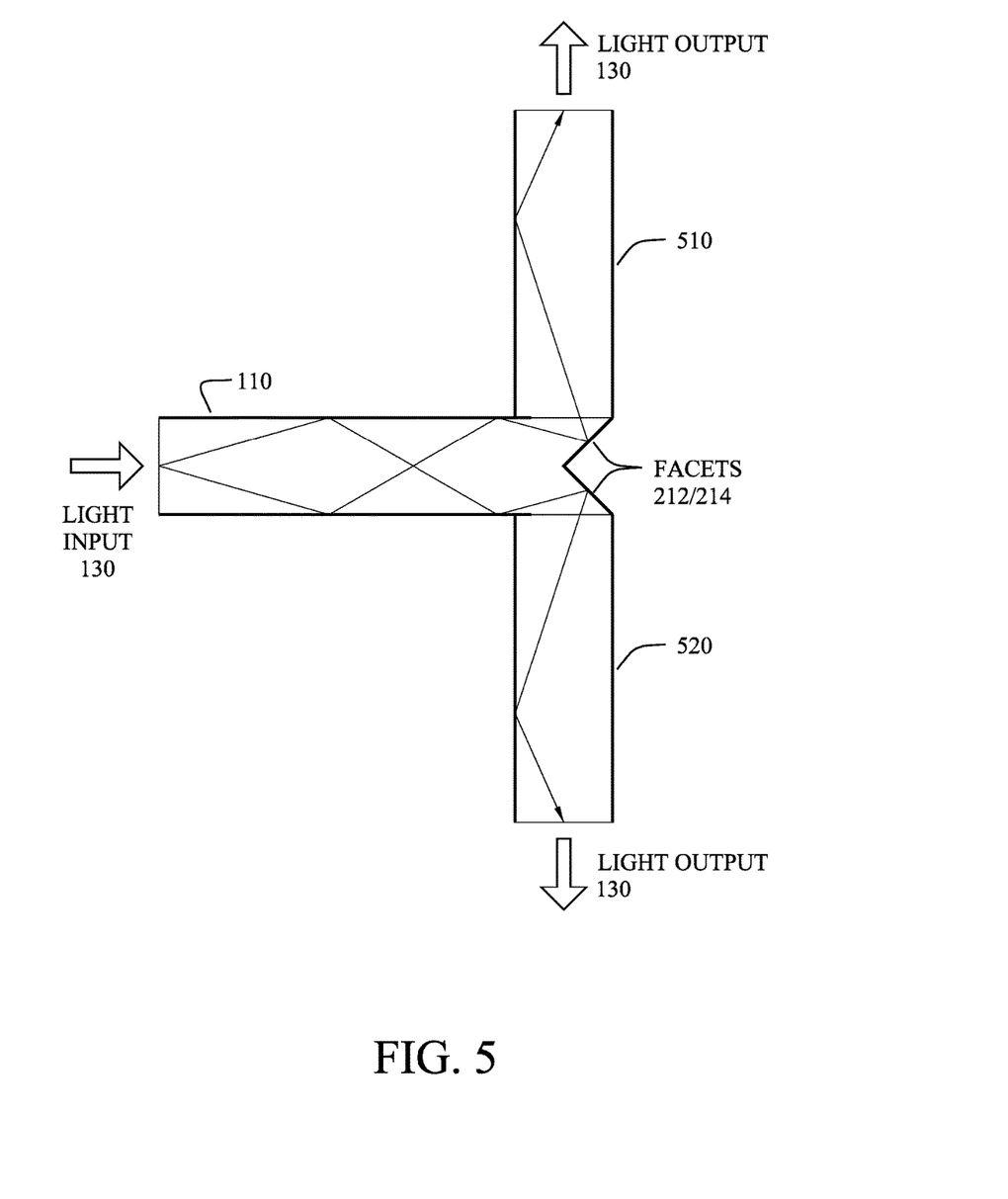
FIGS. 5-8 illustrate example optical waveguide configurations.
Figure 6:
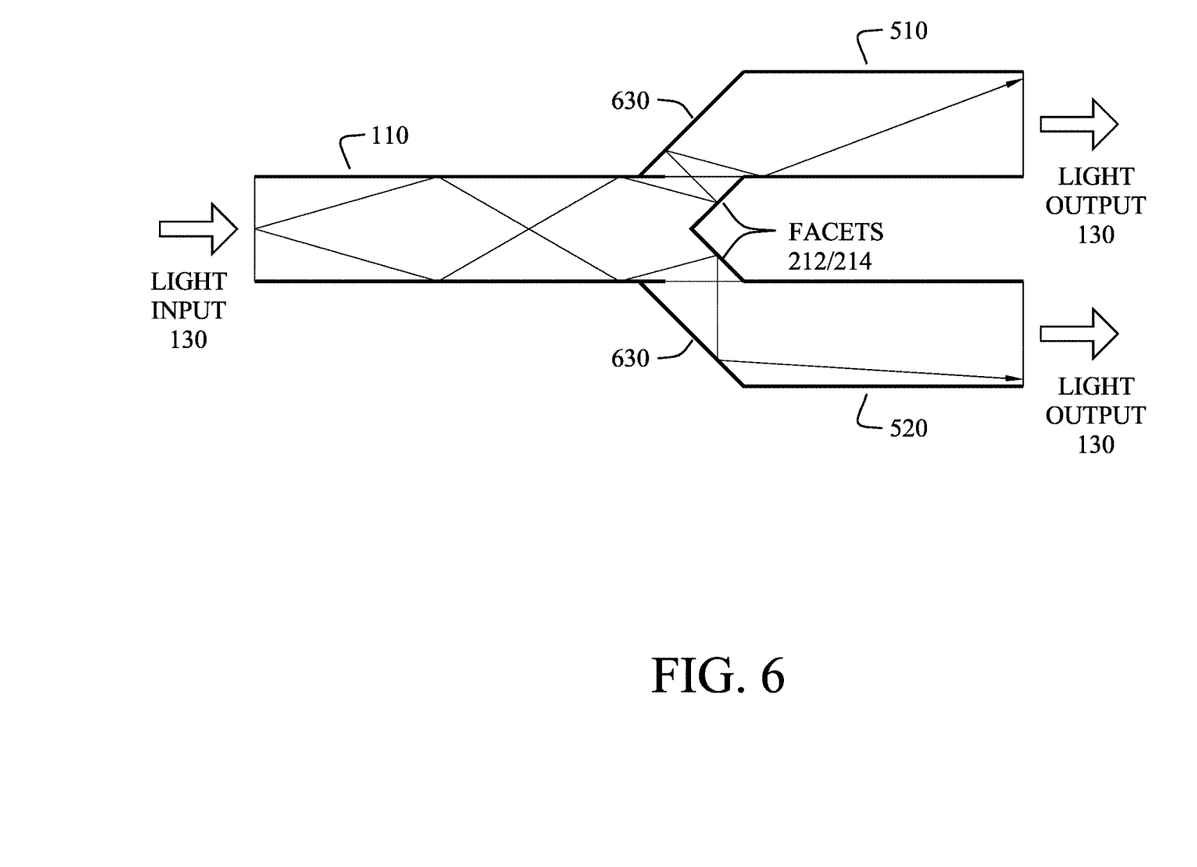
Figure 7:
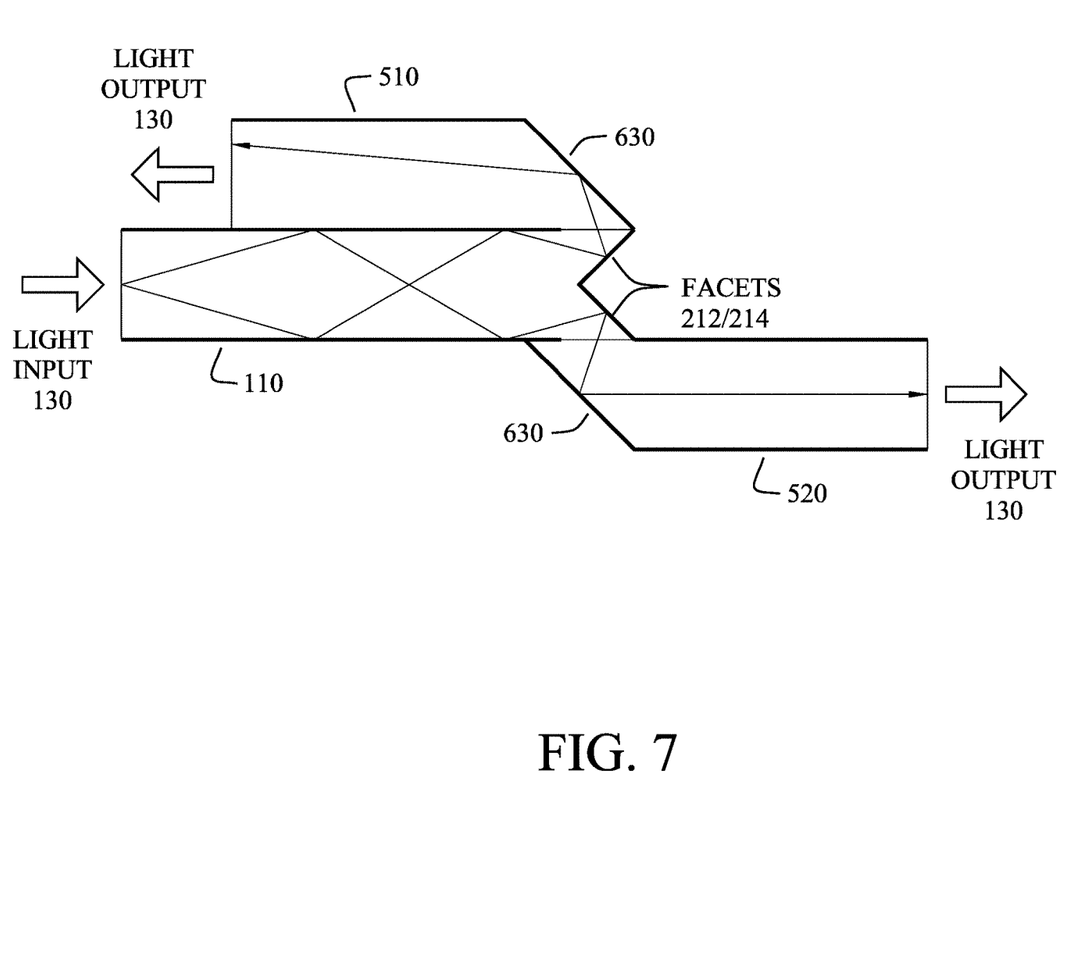

Once these two facets are realized, then the waveguide can be configured as a photonic splitter/coupler (e.g., 45-degree facets for a 50/50 photonic splitter). In general, once the desired splitting ratio is obtained, the output can be configured in many orientations based on the desired optical paths. This allows for a better layout to optimize the design and minimize the final footprint of the optical system. FIGS. 5-7 illustrate some basic output orientations (e.g., for simplicity showing only a two-dimensional waveguide instead of the three-dimensional waveguide with the square section), where second and third waveguide channel cores (510 and 520, respectively) are located at correspondingly opposing sides of the first waveguide channel core. That is, the first and second mirrored facets 212 and 214 are configured to provide optical reflection into and/or from the second and third waveguide channel cores 510 and 520, respectively.

Note that the formation of the waveguide splitters/couplers herein may be based on removing material (core) to create the trench 210, or forming the trench 210 as the original shape of the waveguide core 110. If the core 110 is already clad, then a portion of the clad 120 needs to be removed where the optical signal is expected to travel into/from the additional waveguide cores (channels, paths, guides, etc.). In one embodiment herein, the waveguide channel cores may be created separately and combined together, or else the entire assembly may be created at once in the desired shape (e.g., and then all channel cores may be clad simultaneously). In general, whether combined or formed in combination, the illustrative embodiments herein provide that the first waveguide channel core 110 is directly mated to each of the second and third waveguide channel cores 510 and 520, i.e., with no "free-space" in-between.

With reference now to FIGS. 5-7, one or both of the second and third waveguide channel cores 510 and 520 may be in a direction different from the first waveguide channel core 110, or else may be in a same direction of the first waveguide channel core, but at an offset. For instance, in the example in FIG. 5, a "T-shape" may be formed by attaching regular square waveguide channel cores 510 and 520 to each opposing side of the end of the first channel core 110. FIG. 6, on the other hand, shows a linear forward shape formed by attaching two 45-degree-angled and metalized (mirrored) square waveguides 510 and 520, with angles 630 as shown. Lastly, FIG. 7 shows an alternative linear shape with one splitting leg 510 in a forward direction (same as the first channel core 110, but offset), and the other leg 520 in a reverse direction.

Figure 8:
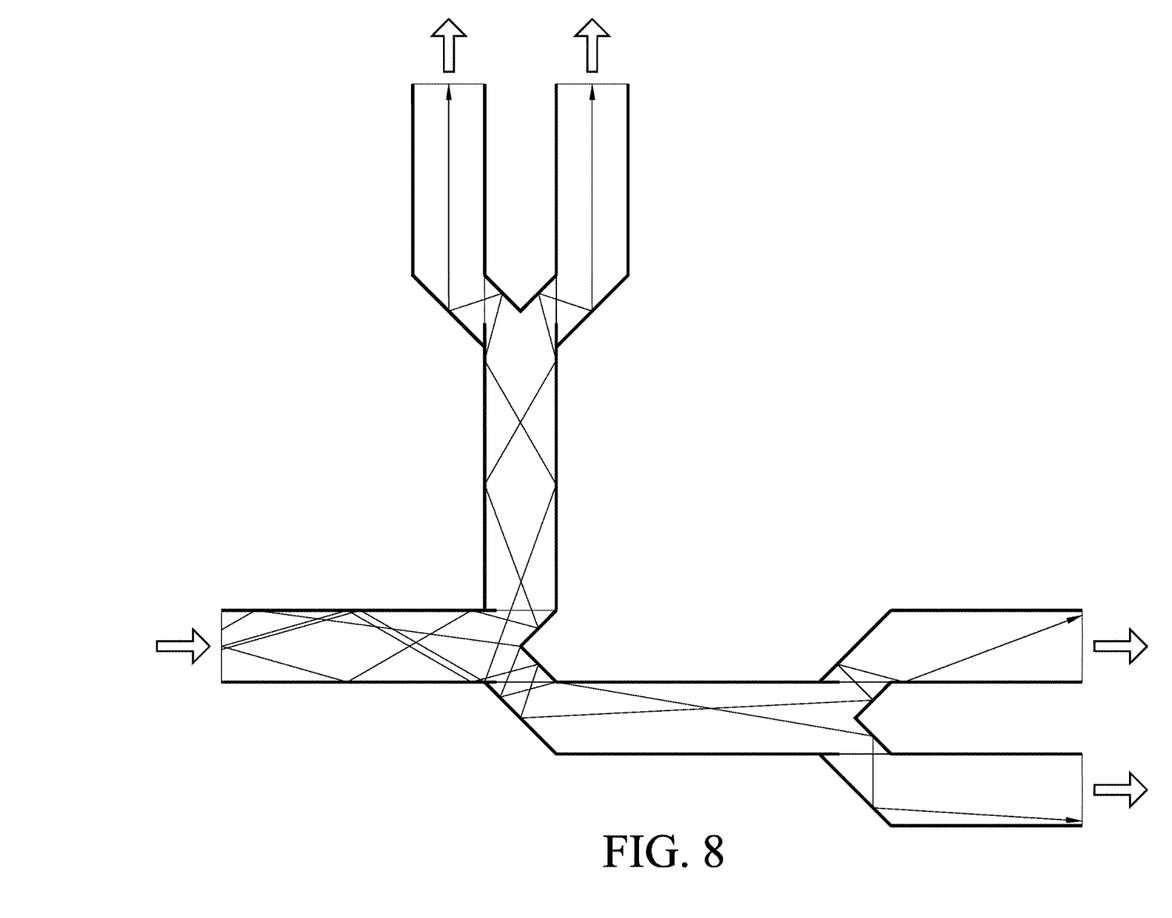

Notably, any orientation can be realized with these simple blocks and by adjusting the output orientation of the splitting legs 510/520, accordingly. Furthermore the blocks above can be used as building blocks for more complex splitters, such as, for example, if one wanted to realize a 1-by-4 splitter (e.g., with equal splitting ratio), then the techniques herein may be extended to fabricate these simple blocks and daisy-chain them, thus in this case creating three simple block structures and combining them, such as shown in FIG. 8.

Figure 9A:
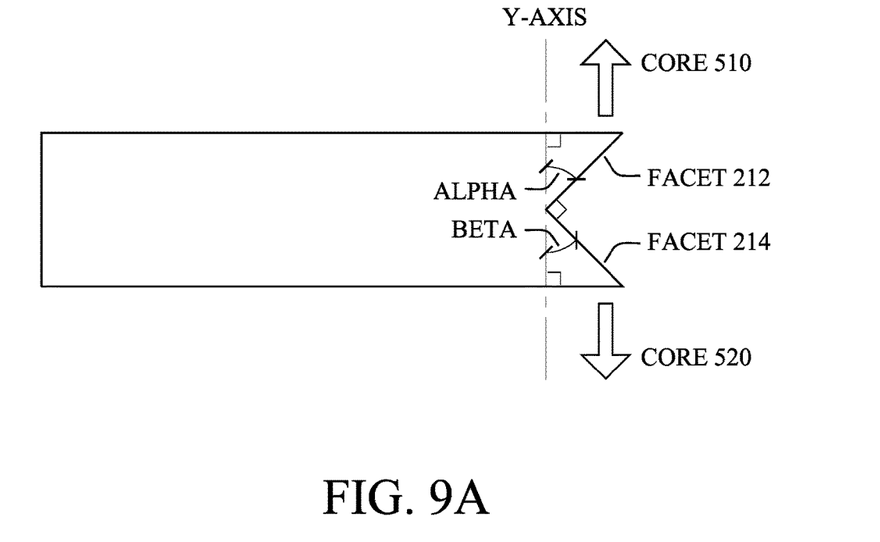
FIGS. 9A-9B illustrate an example of facet angles based on splitting ratios.

The techniques herein may also be used to define the facet angles for any desired splitting or coupling ratio. That is, any splitting ratio can be obtained following these considerations, and with reference generally to FIG. 9A. For instance, FIG. 9A shows the angle that each end facet is forming with respect to the Y-axis (on the cross-sectional plane). The empirical equations Eq.1 and Eq.2 are as follows:

$$\text{Alpha(in degrees)}=90*Y; \text{ and} \qquad \qquad \text{Eq.1:}$$

$$\text{Beta(in degrees)}=90*X, \qquad \qquad \text{Eq.2:}$$

where X and Y are the desired splitting ratios (in percentage) into the second and third waveguide channel cores 510 and 520, respectively (e.g., X:Y is the 510:520 ratio), and needed to satisfy the following relationship:

$$X+Y=1. \qquad \qquad \text{Eq.3:}$$

In other words, X and Y are in percentages, and X+Y=100%, while Alpha and Beta are the angles formed by the plane of each facet with respect to the cross-section of the waveguide, where these angles are needed to satisfy the following relationship:

$$\text{Alpha+Beta}=90 \text{ degrees.} \qquad \qquad \text{Eq.4:}$$

Figure 9B:
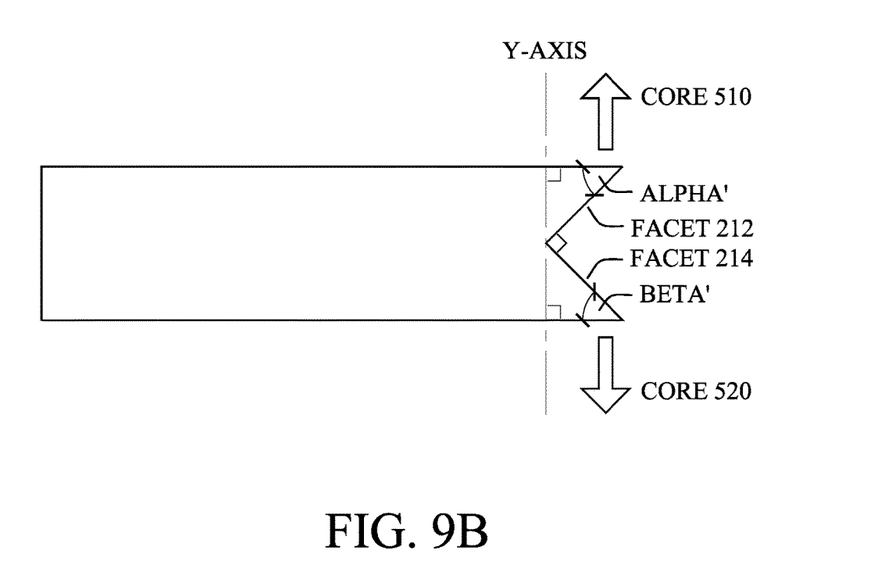

Also bear in mind that when corresponding to the cross-sectional axis (Y-axis), X is the splitting ratio of the facet with angle Beta, while Y is the splitting ratio of the facet with angle Alpha (in the example as shown). If the consideration of the angles were with respect to the sides of the waveguide core (i.e., as shown in FIG. 9B), then $$\text{Alpha'(in degrees)}=90*X; \text{ and} \qquad \text{Eq.1':}$$

$$\text{Beta'(in degrees)}=90*Y, \qquad \text{Eq.2':}$$

where Alpha'+Beta'=90 degrees, still. Regardless of the perspective, due to the relationships between different parameters through equations 1, 2, 3, and 4 (or 1', 2', 3, and 4), once one parameter is fixed the rest will be derived. For example if a splitting ratio of 60/40 is desired (into 510/520, respectively), meaning X=60% and Y=40%, then Beta=90*0.6=54 degrees, and Alpha=90−54 (or 90*0.4)=36 degrees. (Said differently for FIG. 9B, Alpha'=54 degrees, and Beta'=36 degrees.)

Figure 10:
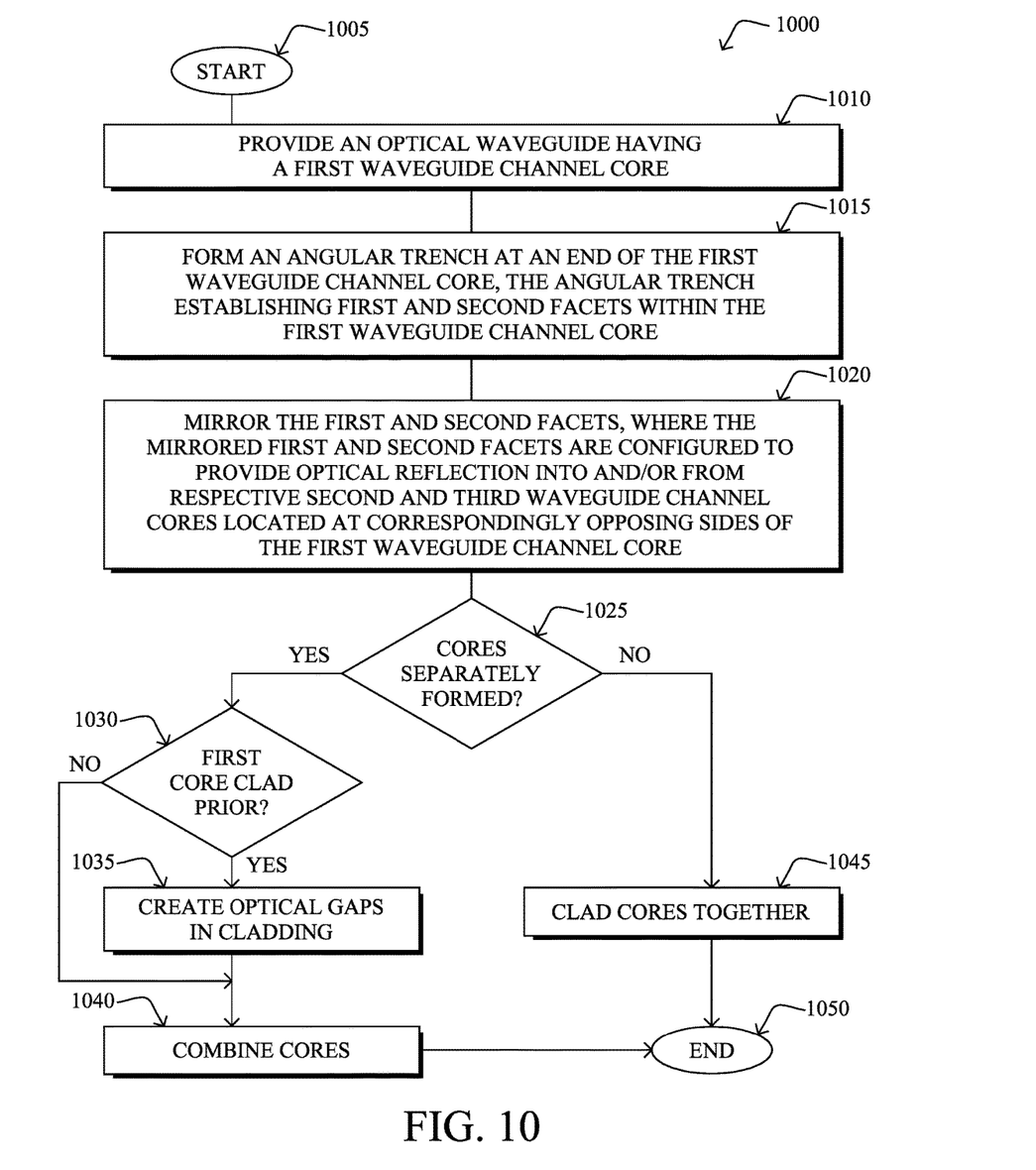
FIG. 10 illustrates an example simplified procedure for embedded universal waveguide optical splitters/couplers, particularly for manufacturing embedded universal waveguide optical splitters/couplers.

FIG. 10 illustrates an example simplified procedure for embedded universal waveguide optical splitters/couplers in accordance with one or more embodiments described herein, particularly for manufacturing embedded universal waveguide optical splitters/couplers (e.g., where the optical waveguide is a component of either a photonics chip or a PCB). (Note that FIG. 10 makes no assumption of which specific waveguide creation technique is used, such as for polymer/glass waveguides, photonic chip creation, PCB printing, etc., and is merely directed at the portions of the manufacturing process that are described herein as could be applied within a more detailed manufacturing process that will be understood by those skilled in the art.)

The procedure 1000 may start at step 1005, and continues to step 1010, where, as described in greater detail above, an optical waveguide is provided having a first waveguide channel core. In step 1015, an angular trench is formed at an end of the first waveguide channel core, the angular trench establishing first and second facets within the first waveguide channel core. Then, in step 1020, the first and second facets may be mirrored, e.g., as described above, where the mirrored first and second facets are configured to provide optical reflection into and/or from respective second and third waveguide channel cores located at correspondingly opposing sides of the first waveguide channel core. As detailed above, in particular, mirroring may comprise depositing a metallic layer at the first and second facets (a deposited metallic layer), such as through atomic deposition, atomic deposition with a laser excimer, or deposition of a layer of metallic film. Alternatively, mirroring may comprise fitting a pre-fabricated angular mirrored wedge within the angular trench, the angular mirrored wedge having first and second complimentary mirrored facets that fit against the first and second facets of the angular trench, respectively.

In the event that the first, second, and third waveguide channel cores are formed separately (decision step 1025), and if the first waveguide channel core is clad prior to forming the angular trench (decision step 1030), the procedure further comprises creating first and second optical gaps in cladding of the first waveguide channel core in step 1035 to provide optical passage into and/or from the respective second and third waveguide channel cores. Then, in step 1040, the first, second, and third waveguide channel cores may be combined. If, in step 1025, the first, second, and third waveguide channel cores are formed together, or if in step 1030 first waveguide channel core is not clad prior to forming the angular trench, the procedure may further comprise cladding the first, second, and third waveguide channel cores together (after the first and second facets are mirrored) in step 1045.

The illustrative simplified procedure 1000 may then end in step 1050, notably with the option to create further facets at additional ends of the waveguide channel cores, or else to add/interface the completed waveguides to other components of a chip/PCB, and so on.

Figure 11:
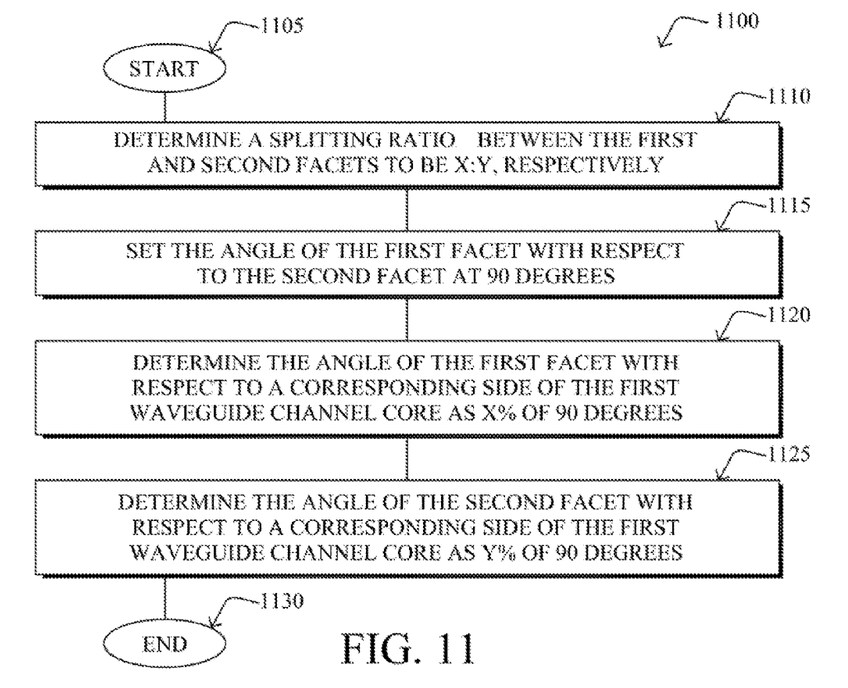
FIG. 11 illustrates an example simplified procedure for embedded universal waveguide optical splitters/couplers, particularly for determining the angular orientation of the reflective facets to achieve a desired split ratio.

Additionally, FIG. 11 illustrates an example simplified procedure for embedded universal waveguide optical splitters/couplers in accordance with one or more embodiments described herein, particularly for determining the angular orientation of the reflective facets to achieve a desired split ratio. The procedure 1100 may start at step 1105, and continues to step 1110, where, as described in greater detail above, a splitting ratio is determined between the first and second facets to be X:Y, respectively (e.g., where X and Y are each greater than zero, and where X %+Y %=100%, such as 70:30), based on design choices for various reasons as will be appreciated by those skilled in the art. The angle of the first facet with respect to the second facet is set at 90 degrees in step 1115. Based on these assumptions, in step 1120 the angle of the first facet with respect to a corresponding side of the first waveguide channel core may be determined as X % of 90 degrees (e.g., 70% of 90 degrees is 63 degrees), and in step 1125 the angle of the second facet with respect to a corresponding side of the first waveguide channel core may be determined as Y % of 90 degrees (e.g., 30% of 90 degrees is 27 degrees). The simplified procedure 1100 may then end in step 1130, with the appropriate angles of the facets, accordingly. Notably, other techniques may be used to set the angles of the facets, and FIG. 11 is merely one example.

Figure 12:
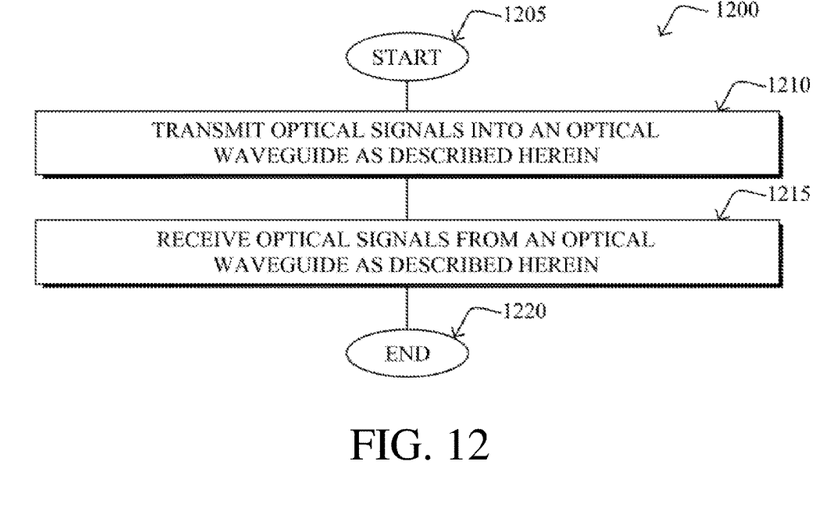
FIG. 12 illustrates an example simplified procedure for embedded universal waveguide optical splitters/couplers, particularly for using the embedded universal waveguide optical splitters/couplers.

Lastly, FIG. 12 illustrates an example simplified procedure for embedded universal waveguide optical splitters/couplers in accordance with one or more embodiments described herein, particularly for using the embedded universal waveguide optical splitters/couplers as described herein. The simplified procedure 1200 may start at step 1205, and continues to step 1210, where optical signals are transmitted into an optical waveguide described herein (e.g., having a first waveguide channel core; an angular trench formed at an end of the first waveguide channel core; first and second mirrored facets within the first waveguide channel core established at the angular trench; and second and third waveguide channel cores located at correspondingly opposing sides of the first waveguide channel core, where the first and second mirrored facets are configured to provide optical reflection into and/or from the second and third waveguide channel cores, respectively). In step 1215, optical signals may also be received from the optical waveguide (e.g., split and/or combined signals), accordingly. The simplified procedure 1200 may then end in step 1220.

It should be noted that while certain steps within procedures 1000-1200 may be optional as described above, the steps shown in FIGS. 10-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1200 are described separately, certain steps from each procedure may be incorporated into each other procedure, and the procedures are not meant to be mutually exclusive.

The techniques described herein, therefore, provide for embedded universal waveguide optical splitters/couplers. In particular, the techniques herein enable low-cost silicon photonics ASICs (application-specific integrated circuit) or any chip or complex next-generation optical PCBs or systems, for both polymer waveguides and glass type waveguides, while maintaining minimal signal losses (e.g., <0.1 dB) due to having substantially no free-space within the path of the optical signal. Also, the techniques above allow for any direction of the reflective redirection (e.g., allowing for versatile and space-saving design), and also allow any ratio of splitting by selecting the appropriate angular orientation of the reflective facets. Moreover, the design is compatible with any layout tool and doesn't require any experience where the tool's building blocks can just be copied and pasted.

Notably, unlike bulky splitters/couplers, such as those that use standalone prisms attached to a polymer wave, the techniques herein can both split and combine the light, can be integrated within a chip or in inner layer of a PCB, and can operated for both single mode and multimode, all with substantially the same dimensions as the waveguide itself (e.g., in a single mode example, only about 9 microns). Prism-based systems, on the other hand, cannot come close to those sizes, plus the losses in those prisms are high (e.g., more than 0.5 dB for only reflecting the light, plus losses associated with splitting or combining the beams).

Furthermore, visible light distribution systems that use reflective mirrors to distribute light are possible because the source is not coherent and diffuses in all directions, making it easy to reflect the light in different directions; however, since the intended systems herein deal with coherent laser sources, such light distribution systems is cannot be used. These systems are also usually much too large for small-scale optical systems (e.g., only up to 60 to 70 microns square), and they need to be positioned separately and/or actively aligned in a hollow multimode waveguide (not in polymer or glass type waveguides), rendering them inadequate for use in optical PCBs.

While there have been shown and described illustrative embodiments that provide for embedded universal waveguide optical splitters/couplers, it is to be understood that various other adaptations and modifications may be made within the spirit and scope of the embodiments herein. For example, the embodiments have been shown and described herein with relation to specific optical waveguide materials and photonics applications. However, the embodiments in their broader sense are not as limited, and may, in fact, be used with other types of suitable materials and applications. In addition, while certain waveguide orientations and/or shapes/sizes are shown or mentioned, other suitable arrangements may be used, accordingly.

It is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. For instance, certain techniques described herein may be performed by hardware, software, and/or firmware (of a non-generic computer), such as in accordance with various processes (e.g., for manufacturing and/or using the waveguides herein), which may contain computer executable instructions executed by a processor to perform functions relating to the techniques described herein.

Figure 13:
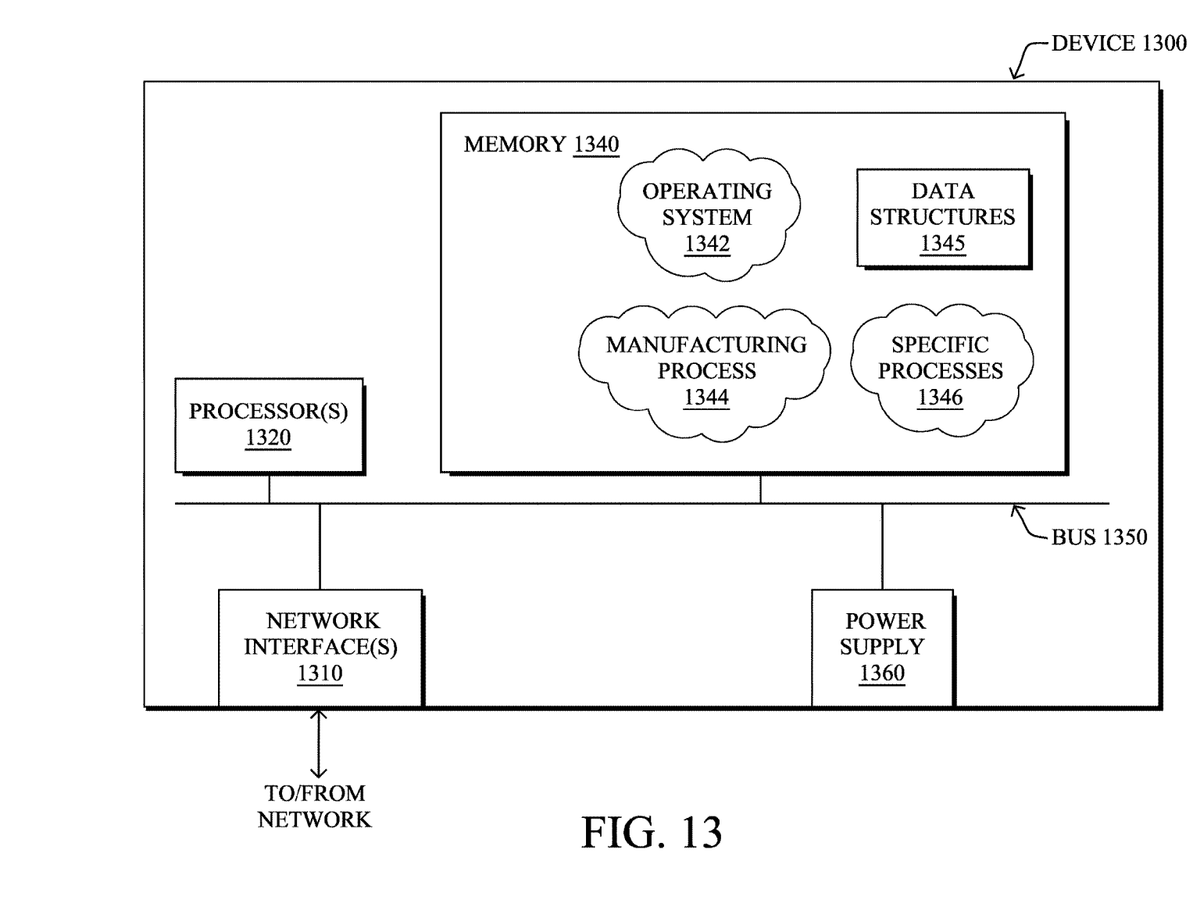
FIG. 13 illustrates an example computing device for use with embedded universal waveguide optical splitters/couplers.

FIG. 13, therefore, is a schematic block diagram of an example non-generic computing device 1300 that may be used with one or more embodiments described herein, accordingly. The device may comprise one or more network interfaces 1310, at least one processor 1320, and a memory 1340 interconnected by a system bus 1350. The network interface(s) 1310 contain the mechanical, electrical, and signaling circuitry for is communicating data over links coupled to a computer network using a variety of different communication protocols. The memory 1340 comprises a plurality of storage locations that are addressable by the processor 1320 and the network interfaces 1310 for storing software programs and data structures associated with the embodiments described herein. The processor 1320 may comprise hardware elements or hardware logic adapted to execute the software programs and manipulate data structures 1345. An operating system 1342, portions of which are typically resident in memory 1340 and executed by the processor, functionally organizes the device by, among other things, invoking operations in support of software processes and/or services executing on the device. These software processes and/or services in one embodiment may comprise a manufacturing process 1344, which contains computer executable instructions executed by the processor 1320 to perform functions necessary to manufacture the optical waveguides described above, as will be appreciated by those skilled in the art. In an alternative embodiment, these software processes and/or services may comprise one or more specific processes 1346, which contain computer executable instructions executed by the processor 1320 to perform functions that would make use of the optical waveguides described above, where such optical waveguides may be a portion of any of the components of device 1300, accordingly (e.g., network interfaces 1310, processor(s) 1320, bus 1350, etc.).

The foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
providing an optical waveguide having a first waveguide channel core;
forming an angular trench in an end of the first waveguide channel core by removing a wedge out of the end of the first waveguide channel core, the angular trench establishing first and second facets within the first waveguide channel core; and
creating a mirror-like finish on the first and second facets of the first waveguide channel core, wherein the mirrored first and second facets are configured to provide optical reflection into and/or from respective second and third waveguide channel cores located at correspondingly opposing sides of the first waveguide channel core.

2. The method as in claim 1, wherein creating a mirror-like finish comprises:
depositing a metallic layer at the first and second facets.

3. The method as in claim 2, wherein depositing comprises a technique selected from a group consisting of: atomic deposition; atomic deposition with a laser excimer; and deposition of a layer of metallic film.

4. The method as in claim 1, wherein creating a mirror-like finish comprises:

fitting a pre-fabricated angular mirrored wedge within the angular trench, the angular mirrored wedge having first and second complementary mirrored facets that fit against the first and second facets of the angular trench, respectively.

5. The method as in claim 1, wherein the first waveguide channel core is clad prior to forming the angular trench, the method further comprising:
creating first and second optical gaps in cladding of the first waveguide channel core to provide optical passage into and/or from the respective second and third waveguide channel cores.

6. The method as in claim 1, wherein the first, second, and third waveguide channel cores are formed together, the method further comprising:
cladding the first, second, and third waveguide channel cores together after the first and second facets are mirrored.

7. The method as in claim 1, wherein the first, second, and third waveguide channel cores are formed separately, the method further comprising:
combining the first, second, and third waveguide channel cores.

8. The method as in claim 1, wherein the optical waveguide is a component of either a photonics chip or a printed circuit board (PCB).

9. The method as in claim 1, wherein:
a splitting ratio between the first and second facets is X:Y, respectively, where X and Y are each greater than zero, and where X %+Y %=100%;
an angle of the first facet with respect to the second facet is 90 degrees;
an angle of the first facet with respect to a corresponding side of the first waveguide channel core is X % of 90 degrees; and
an angle of the second facet with respect to a corresponding side of the first waveguide channel core is Y % of 90 degrees.

10. An apparatus, comprising:
an optical waveguide having a first waveguide channel core;
an angular trench formed by removing a wedge out of an end of the first waveguide channel core;
first and second mirrored facets within the first waveguide channel core formed by the angular trench; and
second and third waveguide channel cores located at correspondingly opposing sides of the first waveguide channel core;
wherein the first and second mirrored facets are configured to provide optical reflection into and/or from the second and third waveguide channel cores, respectively.

11. The apparatus as in claim 10, wherein the first and second mirrored facets each comprise a deposited metallic layer.

12. The apparatus as in claim 10, wherein the first and second mirrored facets comprise an angular mirrored wedge fit within the angular trench, the angular mirrored wedge having first and second complementary mirrored facets that fit against first and second facets of the first waveguide channel core formed by the angular trench, respectively.

13. The apparatus as in claim 10, wherein the optical waveguide is a component of either a photonics chip or a printed circuit board (PCB).

14. The apparatus as in claim 10, wherein:
a splitting ratio between the first and second mirrored facets is X:Y, respectively, where X and Y are each greater than zero, and where X %+Y %=100%;
an angle of the first mirrored facet with respect to the second mirrored facet is 90 degrees;
an angle of the first mirrored facet with respect to a corresponding side of the first waveguide channel core is X % of 90 degrees; and
an angle of the second mirrored facet with respect to a corresponding side of the first waveguide channel core is Y % of 90 degrees.

15. The apparatus as in claim 10, wherein the first waveguide channel core is directly mated to each of the second and third waveguide channel cores.

16. The apparatus as in claim 10, wherein at least one of the second and third waveguide channel cores is in a direction different from a direction of the first waveguide channel core.

17. The apparatus as in claim 10, wherein at least one of the second and third waveguide channel cores is in a same direction of the first waveguide channel core and at an offset from the first waveguide channel core.

18. The apparatus as in claim 10, wherein one or more of the first, second, and third waveguide channel cores comprise a material selected from a group consisting of: a polymer core; and a glass core.

19. The apparatus as in claim 10, wherein one or more of the first, second, and third waveguide channel cores comprise a cross-sectional shape selected from a group consisting of: a rectangle; a square; and a circle.

20. A method, comprising:
transmitting optical signals into an optical waveguide having:
a first waveguide channel core;
an angular trench formed by removing a wedge out of an end of the first waveguide channel core;
first and second mirrored facets within the first waveguide channel core formed by the angular trench; and
second and third waveguide channel cores located at correspondingly opposing sides of the first waveguide channel core, wherein the first and second mirrored facets are configured to provide optical reflection into and/or from the second and third waveguide channel cores, respectively; and
receiving optical signals from the optical waveguide.

* * * * *

UNITED STATES PATENT AND TRADEMARK OFFICE
CERTIFICATE OF CORRECTION

Page 1 of 1

PATENT NO. : 9,658,397 B1
APPLICATION NO. : 15/080872
DATED : May 23, 2017
INVENTOR(S) : D. Brice Achkir et al.

It is certified that error appears in the above-identified patent and that said Letters Patent is hereby corrected as shown below:

In the Specification

In Column 2, Line 30, please amend as shown:
to split signals at a ratio other than 50/50 without In Column 3, Line 47, please amend as shown:
against the first and second facets 212 and 214 of the In Column 7, Line 31, please amend as shown:
sources, such light distribution systems cannot be used.

In Column 8, Line 4, please amend as shown:
Signaling circuitry for communicating data over links Signed and Sealed this
Twelfth Day of January, 2021

Andrei Iancu
*Director of the United States Patent and Trademark Office*